United States Patent [19]

Wei

[11] 4,299,940
[45] Nov. 10, 1981

[54] PROCESS FOR THE CONTROL OF FREE RADICAL POLYMERIZATION

[75] Inventor: Chung H. Wei, Bolton, Mass.

[73] Assignee: Stauffer Chemical Company, Westport, Conn.

[21] Appl. No.: 108,188

[22] Filed: Dec. 27, 1979

[51] Int. Cl.³ .................... C08F 214/06; C08F 230/02
[52] U.S. Cl. .................................. 526/278; 428/402; 525/287; 526/275
[58] Field of Search ................ 525/287; 526/212, 275, 526/278

[56] References Cited

U.S. PATENT DOCUMENTS

| | | | |
|---|---|---|---|
| 3,983,294 | 9/1976 | Goswami | 526/278 |
| 3,993,715 | 11/1976 | Hwa et al. | 526/278 |
| 4,014,837 | 3/1977 | Kraft et al. | 526/278 |
| 4,031,045 | 6/1977 | Goswami | 526/278 |
| 4,035,571 | 7/1977 | Brunner et al. | 526/278 |
| 4,097,663 | 6/1978 | Gallagher et al. | 526/278 |

*Primary Examiner*—Harry Wong, Jr.
*Attorney, Agent, or Firm*—Henry Z. Friedlander

[57] ABSTRACT

The free radical copolymerization of vinyl chloride, vinyl acetate, and bis(hydrocarbyl)vinyl phosphonate in emulsion is moderated by the addition at the beginning of the reaction of an electronically resonating additive such as alphamethylstyrene. The use of such an additive limits the increase in viscosity of the system without retarding the rate of polymerization.

9 Claims, No Drawings

PROCESS FOR THE CONTROL OF FREE RADICAL POLYMERIZATION

BACKGROUND OF THE INVENTION

1. Field of the Invention

This invention relates to free radical polymerization. More particularly it relates to the free radical polymerization of vinyl monomers, especially copolymers of vinyl chloride. Furthermore it relates to the control of free radical copolymerization in emulsion of vinyl chloride, when a bis(hydrocarbyl)vinylphosphonate is a comonomer.

Emulsion polymerization of vinyl monomers generates large amounts of heat usually 18 to 25 kilocalories per mole, termed by those in the art as the "exotherm". If the exotherm is not carefully controlled, the temperature of the reaction can rapidly escalate into an explosion. At the commercial level of batchwise production, 1000 to about 250,000 liters per batch, the temperature of the contents in the reactors is controlled by applying either steam to heat or cold water to cool jacketed reactors.

Temperature control by heating or cooling means surrounding the reactor depends on good heat transfer through the walls of the reactor. Any factor inhibiting good heat transfer, therefore makes large scale vinyl polymerization potentially dangerous.

Before the instant invention, copolymerization of a bis(hydrocarbyl)vinylphosphonate with vinyl chloride and vinyl acetate to make useful vinyl resins generated a rapid rise in viscosity which caused the resin to coat out on the walls of the reactor. This coating lowers the heat transfer characteristics of the reactor to such an extent that temperature control becomes difficult. Absent the control of temperature, the copolymerization process is hazardous when scaled up to the level of 1000 liters or more, restricting production to laboratory (less than 20 liters) or pilot plant scale (20 to 80 liters). With the use of the process of this invention, commercial copolymerization of a bis(hydrocarbyl)vinylphosphonate with vinyl chloride and vinyl acetate may be carried out in batchwise reactors of up to 250,000-liter capacity.

Vinyl chloride/vinyl acetate/bis (hydrocarbyl)vinylphosphonate copolymers have a low fusion temperature so that laminates can be made with fabrics or substrates of comparatively low fusion points themselves, e.g. polypropylene. The bis(beta-chloroethyl)vinylphosphonate comonomer, "bis beta", imparts a rubbery nature to the resin. It is precisely this rubbery attribute which causes the polymerizing latex particles to stick to each other and to the walls of the vessel, reducing the heat transfer coefficients of jacketed reactors. Furthermore, the exotherm in the copolymerization of "bis-beta" with vinyl chloride occurs earlier, at a lower conversion, than does the exotherm for the homopolymerization of vinyl chloride alone. The peak of the exotherm for the homopolymerization of vinyl chloride in emulsion or suspension comes at about 70% conversion. The exotherm for the copolymerization of "bis beta" with vinyl chloride comes at about 30-35% conversion, which makes the reaction more difficult to control. The rate of polymerization of the "bis beta" alone or with vinyl chloride is faster than that of vinyl chloride alone.

2. Description of the Prior Art

In U.S. Pat. No. 4,097,663 granted to Gallagher and Goswami on June 27, 1978 a process for the copolymerization of 75 to 90% vinyl chloride, 5 to 15% vinyl acetate, and 5 to 15% bis(hydrocarbyl)vinylphosphonate is disclosed. The low fusion resins of Gallagher et al are useful in making cellular polyvinyl chloride laminates of the type disclosed in U.S. Pat. No. 3,983,294 granted to Goswami on Sept. 28, 1976.

Gulbins et al were granted U.S. Pat. No. 3,781,243 on Dec. 25, 1973 for a process of controlling the temperature in vinyl chloride, vinylidene chloride and vinyl acetate polymerization. Their controlling additive is a copolymerizable additive which has a copolymerization parameter $r_1(r_R)$ greater or equal to 1, a copolymerization parameter $r_2(r_M)$ less than 1, and a reactivity ratio of these two numbers greater than 20.

In U.S. Pat. No. 3,560,462 granted to Farber et al on Feb. 2, 1971 a method for controlling the rate of polymerization of vinyl chloride alone is given. The rate is speeded up in the first half of the polymerization and slowed down in the second half by the addition of a long-chain alpha-olefin.

As reported in Chemical Abstracts 64, 12796 (1966), Tudos and other Hungarian workers inhibit the homopolymerization of vinyl acetate by adding aromatic comonomers.

OBJECTS OF THE INVENTION

The object of this invention is to provide a process to control the viscosity of the free radical, copolymerization of vinyl chloride, vinyl acetate, and bis(hydrocarbyl)vinylphosphonates.

Another object of this invention is to carry out such a copolymerization without interruptions to introduce additives.

A further object of this invention is to provide a process for commercial scale copolymerization of the above type without the danger of escalating the temperature of the reaction.

Another object of this invention is to shorten the time of the copolymerization.

Still another object of this invention is to minimize the possibility of contact or inhalation of toxic compounds by the operators of the reactors.

Other objects will be apparent from the following description and examples.

SUMMARY OF THE INVENTION

The present invention is an improved process for the copolymerization of vinyl chloride, vinyl acetate, and a bis(hydrocarbyl)vinylphosphonate wherein the improvement comprises the step of adding to the monomer feed from the beginning of the reaction an additive of the electrically resonating type, such as alpha-methylstyrene, which unexpectedly controls the viscosity of the polymerization as well as shortening its time.

DESCRIPTION OF THE INVENTION

The process of this invention is especially adaptable to copolymerizations reactions to make resins of about 70 to about 90% vinyl chloride by weight, and about 5 to about 15% bis(hydrocarbyl)vinylphosphonate by weight.

The term "bis(hydrocarbyl)vinylphosphonate" is intended to encompass vinylphosphonates having the structure:

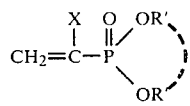

wherein X is selected from the group consisting of hydrogen, halogen, cyano, aryl, such as phenyl, $C_1$–$C_{18}$ alkyl and

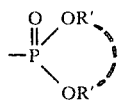

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The term "hydrocarbyl" and "substituted hydrocarbyl" groups refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis-(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of such groups as are represented by R and R' are alkyl or alkenyl groups, such as methyl, ethyl, propyl, butyl, pentyl, hexyl, nonyl, pentenyl, and hexenyl groups and all of their respective isomers: cycloalkyl or cycloalkenyl groups, such as cyclopropyl, cyclobutyl, cyclophenyl, cyclohexyl and cyclohexenyl groups and the like; while typical aryl groups represented by R and R' include phenyl, benzyl, phenethyl, tolyl, naphthyl groups and the like.

Representative of the above depicted bis(hydrocarbyl)vinylphosphonates which may be used in preparing the fire retardant vinyl chloride copolymers of this invention are:

Bis(beta-chloroethyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl)vinylphosphonate;
Di-n-butyl vinylphosphonate
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate.

It should be emphasized, however, that it is preferred to employ bis(beta-chloroethyl)vinylphosphonate in carrying out the process of this invention since the latter monomer is a commercially available material from Stauffer Chemical Company and is lower in cost than any of the other bis(hydrocarbyl)vinylphosphonates listed above.

The preferred composition of the suspension or emulsion copolymer of the process of this invention is about 85% to about 87% vinyl chloride, about 3% to about 8% vinyl acetate and about 5% to about 7% bis(beta-chloroethyl)vinylphosphonate. The process of this invention is carried out by subjecting the foregoing monomers to conventional suspension or emulsion polymerization procedures which are well known to persons of ordinary skill in the art.

Suitable water soluble, free radical initiating catalysts for use in this invention include sodium, potassium and ammonium persulfate and hydrogen peroxide, or one may use a redox system such as, for example, a mixture of a persulfate with an alkali metal disulfite, thiosulfate or hydrosulfite. These catalysts should be present in a concentration of from 0.1 to 5%, by weight, of the total monomer charge. With respect to the emulsifier or surfactant, it is possible to utilize one or more anionic, cationic, or non-ionic emulsifiers such, for example, as the alkyl carboxylic acid salts; and alkyl sulfate, sulfonate, phosphate, or sulfosuccinate salts; the alkyl aryl ether alcohols, and the alkyl aryl polyether sulfate salts. The emulsifier or emulsifiers selected should be present in a total concentration of from about 0.3 to 8%, by weight, of the total monomer charge. In addition, a protective colloid such as polyvinyl alcohol, methyl cellulose or gelatin can also be present in the recipe, if desired, in a concentration of from about 0.05 to 5%, by weight, of the total monomer charge.

Normally, emulsion polymerizations of this type yield a product 0.4 micrometers (microns) or less in particle size. For the application of the resins to which this invention is directed, a larger particle size of 0.8 to 1.0 microns is desired. In order to achieve this larger particle size, which makes a superior resinous paste, "seeds" of independently made poly(vinyl chloride), PVC, are added to the system at the beginning of the polymerization in the form of a latex so that the vinyl chloride/vinyl acetate/"bis beta" copolymer can form by accretion on these "seeds". A seed latex in an amount of from about 5 to 15% by weight of total monomers charged are preferred; 9 to 10% PVC seed latex by weight of monomers charged are more particularly preferred. Copolymeric "seeds" of vinyl chloride/vinyl acetate/"bis beta" can also be employed, as prepared in U.S. Pat. No. 4,097,663 cited above.

The actual polymerization reaction is ordinarily carried out at a temperature of from about 30° to 80° C. for a period of from about 6 to 24 hours, depending upon such factors as the particular monomer, catalysts, surfactants and polymerization apparatus that is being utilized. The pressure above the aqueous polymerizing system during the reaction will range from about 2.5 to about 6 atmospheres gauge since vinyl chloride monomer is a gas. The latices resulting from this polymerization process will ordinarily have a resin solids content of from about 20 to 50%, by weight, wherein the particles range in size from about 0.02 to 2 microns, but when seeds are used, as preferred, the size will be 0.8 to 1.0 microns.

As for the viscosity controlling additives, these are organic-soluble compounds which form electronically resonating free radical structures. Two classes exist, those which are copolymerizable in the polymerization reaction taking place and those which are not. An excellent example of the copolymerizable type is alpha-methylstyrene. An excellent example of the noncopolymerizable class is butylated hydroxytoluene, an antioxidant commercially used in the food, paint, and other industries.

Electronically resonating free radicals and compounds which form them under free radical conditions are believed to control the viscosity of the copolymerization by a series of complex reactions involving chain transfer, chain termination, and resonance between a number of canonical forms. These forms may be of the aromatic type, the enolic type, or the hyperconjugative type. The efficacy of this invention does not depend on the correctness of this hypothesis.

Polymer chemists characterize the copolymerization activity of various vinyl monomers by their $r_1$ $r_2$ values, or copolymerization reactivity ratios. From $r_1$ and $r_2$ values, Q-e values can be calculated. Lists of $r_1$ $r_2$ data can be found at pages II-141 to II-340 and Q-e values can be found at pages II-341 to II-362 of "Polymer Handbook", edited by Brandrup and Immergut, Interscience, New York, 1966. The function e is a rough measure of a vinyl monomer's polarity at its double bond. The function Q is a rough measure of the resonance stability of its radical. Q-e values are considered only on an empirical basis by skilled workers.

The preferred monomeric compositions for controlling the viscosity of the copolymerization of vinyl chloride, without inhibiting it unduly, are selected from those compounds which have "e" values more negative than $-0.5$ and "Q" values greater than 0.9. Examples of these are alphamethylstyrene (e = $-1.27$, Q = 0.98), styrene (e = $-0.8$, Q = 1), 1,3-butadiene (e = $-1.05$, Q = 2.39) and acenaphthalene (e = $-0.8$, Q = 0.26). Much less favored are comonomers with very high "Q" values with low negative or even positive "e" values such as 2-chlorobutadiene (e = $-0.02$, Q = 7.26) or 2,3-dichlorobutadiene (3 = $+0.48$, but Q = 12.86).

Less preferred for carrying out the process of the instant invention are noncopolymerizable, organic compounds which are sources of resonanting, stable free-radicals such as hydroquinone and butylated hydroxytoluene.

The compounds disclosed as retarders for a different process in U.S. Pat. No. 3,781,243 are not effective for use in the instant invention. Some examples of these are acrylonitrile (e = 1.2, Q = 0.6), methyl methacrylate (e = 0.4, Q = 0.74), acrolein (e = 0.73, Q = 0.85), and methyl vinyl ketone (e = 0.68, Q = 0.69). Such compounds are inoperative in this invention.

The amount of electronically resonating composition employed in the present process can range from about 0.0005% to about 0.1% of the weight of the total monomers charged into the reactor during the course of the polymerization. Surprisingly, the low end of this range about 0.0005 to about 0.005 weight percent of the total monomers charged is effective and is preferred. Also preferably the total (small) amount of the viscosity-controlling additive is charged in with the monomers in one portion in the first phase of the reaction. This is a surprising result when compared to the prior art cited above, wherein inhibitors, retarders, or other rate controlling additives are continuously introduced into the mixture during the reaction, or introduced into the mixture after the polymerization has begun.

In a copolymerization between vinyl chloride, vinyl acetate, and a bis(hydrocarbyl)vinylphosphonate without employing the process of this invention, the viscosity of the polymerizing mass, which is very fluid at the beginning, increases slowly during the first four hours of the polymerization. At this point the viscosity rapidly builds up to a thick creamy consistency and deposits from about 3 to about 8 mm of rubbery polymer on the walls of the reactor markedly lowering the heat transfer capability of the reactor. The decrease in heat transfer capability results in a diminished cooling function of the jacketed reactor, a hazardous condition. With the use of the process of this invention the viscosity of the copolymerization rises only slightly to that of a normal polymeric latex, and the inside surface of the reactor remains clean. With the heat transfer characteristics of the reactor preserved, the copolymerization can be controlled.

The following examples illustrate the utility and best mode of the invention, but should not be interpreted as limiting its scope.

EXAMPLE 1

This example discloses the preparation of poly(vinyl chloride), PVC, latex used as a "seed" to build up the particle size of the emulsion copolymers of the instant invention.

A 120-liter, stainless steel, reactor was rinsed with deionized water and emptied. Then 50 kg of deionized water was added and a three-blade agitator started at 100 rpm. The temperature control was set at 71° C. and 1 g of ascorbic acid, 2 g disodium phosphate and 100 ml of an emulsifying solution of 40% Sipex UB TM (sodium lauryl sulfate, Alcolac Co.) and 2% Aerosol OT ® (sodium sulfosuccinate, Cyanamid Co.) were added to the reactor. After 30 minutes of vacuum (steam jet aspirator) applied to the reactor, it was purged three times with vinyl chloride at a pressure of 0.67 bar. Then 45 kg of liquid vinyl chloride under pressure was added with the agitator off. Upon resumption of agitation the temperature control was set at 53° C. The reaction was started by the addition of 4 g of 35% hydrogen peroxide dissolved in 1 kg of deionized water at the rate of 200 ml per hour. In order to get the fine particle size desired for these "seeds", about 0.2 micron, additional emulsifier solution was also added during the polymerization at the rate 100 ml per hour. The reaction was held at 52° C. by controlling the rate of catalyst (hydrogen peroxide) addition, less if the temperature increases, more if the temperature decreases. The reaction was finished in 6.5 hours, as indicated by a drop in pressure to 0.1 bar gauge.

EXAMPLE 2

This example illustrates the unstable, "cycling" nature of the reaction conditions when one runs at the pilot plant level of operation without the benefit of the instant invention.

A 120-liter, jacketed, stainless steel reactor was employed. It was equipped with a three-bladed stirrer set at 100 rpm. The reactor was cleaned with ethylene dichloride and then washed out with liberal amounts of deionized water. Then 50 kg deionized water, 1.75 kg of bis(betachloroethyl)vinylphosphonate, 3.5 kg of the PVC latex of Example 1 at 35% solids with an average particle size of about 0.22 micron, and 3.5 kg of vinyl acetate were added to the reactor. Then a steam jet aspirator was employed to evacuate the reactor for 30 minutes. The reactor was then purged three times with vinyl chloride monomer at a pressure of 0.6 atmospheres gauge. Liquid vinyl chloride under 5.5 atmospheres pressure gauge was added in the amount of 33 kg. With the stirred mixture at 52° C. and the pH of 4.4 the polymerization was started by introducing the first two of three solutions to be used: the catalyst, the reductant, and the emulsifier.

The catalyst solution consisting of 4 g of 35% hydrogen peroxide in 1 kg distilled water was pumped into the reactor at the rate of 500 ml/hr. combined with the reductant solution comprising 3 g ascorbic acid and 3 g borax dissolved in 1 kg distilled water. The initial rate of 500 ml/hr was controlled so that the temperature of the reaction mixture stayed below 57° C. (less than 5° C. of exotherm). After 1.5 hours of reaction, an emulsifying solution was introduced into the reactor at a rate of 300 ml/hr. The emulsifying solution comprised 300 g Sipex UB ™ (Alcolac Co.), 50 g Aerosol OT ® (Cyanamid Co.), and 60 g borax in 2 kg distilled water.

After six hours of reaction, the temperature of the liquid contents increased to 60° C. and the pressure in the reactor rose to six atmospheres. At this point the steam circulating in the outside jacket of the reactor was changed to cooling water. Cooling the liquid contents required 20 minutes. Because of heat transfer problems control of the temperature of the liquid contents was difficult so that from the sixth hour of the reaction until the end of the polymerization at the eleventh hour, 13 cycles, requiring 26 heating/cooling operations, were required in attempting to control the "exotherm" and the temperature of the polymerization in the reactor.

The end of the copolymerization was indicated by a fall in the vinyl chloride pressure to three atmospheres or less, with the reaction temperature at 52° C. At this point the agitation was stopped; the reactor was vented; the contents at pH 6.8 emptied through a 100-mesh screen to collect the 0.5 kg of flocculated material, and then spray-dried in a Bowen drier at 120° C. inlet temperature and 63° outlet temperature at a rate of 12 liters/hour. The yield of dried copolymer was 24 kg. After the reaction, the sides of the reactor were coated to a depth of about 10 mm with rubbery copolymer.

EXAMPLE 3

This example illustrates the unexpected results achieved by adding only a small amount of alphamethylstyrene to the polymerizing mixture. The entire eight hour reaction was smooth with respect to both temperature and pressure.

In the same reactor as in Example 2, using the same agitator, pumps, conditions, reagents, and procedures a similar batch of monomers was copolymerized. The initial charge after cleaning was 50 kg of distilled water. To this was added 5 g borax, 3.5 kg PVC latex at 35% solids, (from Example 1), 3.5 kg vinyl acetate, and 1.6 kg bis(betachloroethyl)vinylphosphonate containing this time 2 g alphamethylstyrene. The vessel was evacuated of air, purged three times with vinyl chloride vapor, and then charged with 33 kg of liquid vinyl chloride. At an initial pH of 5.2 and temperature of 53° C, the reaction was commenced by pumping into the reactor at 500 ml/hr a mixture of catalyst and reductant solutions containing 4 g hydrogen peroxide of 35% strength and 3 g ascorbic acid and 3 g borax in 2 kg dionized water. After 1½ hours, when the polymerizing mixture reached about 8% total solids, introduction of the emulsifier solution was started at a rate of 300 ml/hr. This solution consisted of 380 g Sipex-UB ™ (sodium lauryl sulfate), and 30 g Aerosol OT ® (sodium sulfosuccinate) in 3 kg deionized water. During the seven-hour reaction the reaction temperature held constant at 53°±1° C. and the pressure was constant. There was no need to adjust the steam in the outside jacket and the exotherm of the copolymerization was easily handled without any measurable effect. The viscosity of the reaction mixture remained low (less than 10 cps). The product was drained, screened, and spray-dried as in Example 2 to give a yield of 24 kg.

EXAMPLE 4

This example illustrates the reproducibility of the action of a small amount of an electronically resonating compound in controlling the viscosity and the exotherm of the copolymerization. All conditions, amounts, and procedures were the same as in Example 3 except that no borax was charged initially leading to a starting pH of 4.0. The reaction was over in seven hours instead of the 11 hours of Example 2. The maximum viscosity generated was about six cps. One-half kilo of floc was screened out. The yield was 23 kg.

In like manner small quantities of styrene, 1,3-butadiene, butylhydroxytoluene, and acenapththylene may be used as an additive to moderate viscosity.

The foregoing examples illustrate the utility of the instant invention. The scope of legal protection sought is set forth in the claims.

I claim:

1. In a process for the emulsion copolymerization of a reaction mixture comprising a monomer charge having from about 70 to about 90 weight percent vinyl chloride monomer, from about 5 to about 15 weight percent of a bis(hydrocarbyl)vinylphosphonate monomer, and the balance of the monomer charge substantially vinyl acetate, by free radical means the improvement comprising the addition of from about 0.0005 percent to about 0.1 percent of the weight of the monomer charge of a copolymerizable compound having a Q-value greater than 0.9 and an e-value more negative than −0.5 to control the viscosity of the reaction mixture.

2. The process of claim 1 wherein the copolymerizable compound is selected from the group consisting of alpha-methylstyrene, styrene, 1,3-butadiene, and acenaphthylene.

3. The process of claim 1 wherein the bis(hydrocarbyl)vinylphosphonate is bis(beta-chloroethyl)vinylphosphonate.

4. The process of claim 1 wherein the copolymerizable compound is alpha-methylstyrene.

5. The process of claim 1 wherein the copolymerizable compund is styrene.

6. The process of claim 1 wherein the copolymerizable compound is 1,3-butadiene.

7. The process of claim 1 wherein the copolymerizable compound is acenaphthylene.

8. The process of claim 1 wherein the copolymerization is carried out at a temperature from about 30° to about 80° C.

9. The process of claim 1 wherein the amount of the copolymerizable compound added is from about 0.0005 to about 0.005 percent by weight of the total monomers charged.

* * * * *